United States Patent
Tartamella et al.

(10) Patent No.: US 7,572,867 B2
(45) Date of Patent: Aug. 11, 2009

(54) POLYMERIZATION PROCESS FOR PRODUCING POLYDIENES

(75) Inventors: Timothy L. Tartamella, Silver Lake, OH (US); Steven Luo, Copley, OH (US); Mark Smale, Hudson, OH (US); Kevin M. McCauley, Conventry Township, OH (US)

(73) Assignee: Bridgestone Corporation, Chuo-ku, Tokyo (JP)

( * ) Notice: Subject to any disclaimer, the term of this patent is extended or adjusted under 35 U.S.C. 154(b) by 0 days.

(21) Appl. No.: 12/113,375

(22) Filed: May 1, 2008

(65) Prior Publication Data

US 2008/0275199 A1 Nov. 6, 2008

Related U.S. Application Data

(60) Provisional application No. 60/915,128, filed on May 1, 2007.

(51) Int. Cl.
*C08F 2/02* (2006.01)
*C08F 4/52* (2006.01)

(52) U.S. Cl. .......... 526/73; 526/153; 526/164; 526/919

(58) Field of Classification Search .......... 526/73, 526/164, 919, 153
See application file for complete search history.

(56) References Cited

U.S. PATENT DOCUMENTS

| 5,567,784 A | * | 10/1996 | Wieder et al. | 526/164 |
| 7,078,466 B2 | * | 7/2006 | Balducci et al. | 526/73 |
| 2007/0149717 A1 | * | 6/2007 | Luo et al. | 525/331.9 |

* cited by examiner

*Primary Examiner*—Fred M Teskin

(57) ABSTRACT

There is disclosed a process for producing a conjugated diene-containing polymer wherein a stream comprising conjugated diene monomer and a specified catalyst, that includes a lanthanide compound and an aluminoxane, is passed through an orifice into the reaction zone of a polymerization vessel, maintained under specific pressure conditions to form a cement having a viscosity that allows the cement to be conveyed through a devolatilization zone, where desired.

14 Claims, No Drawings

POLYMERIZATION PROCESS FOR PRODUCING POLYDIENES

CROSS REFERENCE TO RELATED APPLICATIONS

This application claims the benefit of U.S. Provisional Application No. 60/915,128 filed May 1, 2007.

FIELD OF THE DISCLOSURE

The present disclosure relates to a process for producing polydienes wherein monomers are polymerized using catalysts that comprise a lanthanide compound and an aluminoxane.

BACKGROUND OF THE DISCLOSURE

The use of lanthanide-containing polymerization catalysts that include aluminoxane are known in the production of desirable polymers having high levels of live ends and cis content. However, the activity of the catalyst system is very high, thus making use of the catalyst difficult on a commercial scale. For example, as the activity of the catalyst becomes more aggressive, the time required to achieve a given conversion level is reduced, and consequently, it becomes more difficult to remove the heat of polymerization at a sufficient rate. Accordingly, there is a need for a process that will allow use of active catalyst systems that produce high polymerization rates which could not normally be tolerated in conventional processes.

SUMMARY OF THE DISCLOSURE

The present disclosure relates to a process for producing a conjugated polydiene wherein conjugated diene monomer is mixed with a lanthanide polymerization catalyst that includes an aluminoxane, in any suitable mixing vessel. The resulting stream comprising a mixture of monomer and catalyst is then passed through an orifice, that creates backpressure, into a polymerization vessel wherein the pressure is maintained at a pressure lower than the pressure of the mixing vessel and wherein the pressure drop across the orifice avoids atomization of the stream comprising monomer and catalyst. In the reaction zone section of the polymerization vessel, the stream comprising monomer and catalyst is formed into a cement which comprises polymer and unreacted monomer, having a viscosity that will allow the cement to be conveyed through the devolatilization zone section of the polymerization vessel, if desired. The cement may be terminated by introducing a termination agent into the reaction zone at a location where polydiene having the desired molecular weight is produced.

DETAILED DESCRIPTION OF THE DISCLOSURE

The present disclosure relates to a process for producing a conjugated polydiene wherein conjugated diene monomer is mixed with a lanthanide polymerization catalyst that includes an aluminoxane, in any suitable mixing vessel. The resulting stream comprising a mixture of monomer and catalyst is then passed through an orifice, that creates backpressure, into a polymerization vessel wherein the pressure is maintained at a pressure lower than the pressure of the mixing zone and wherein the pressure drop across the orifice avoids atomization of the stream comprising monomer and catalyst. In the reaction zone section of the polymerization vessel, the stream comprising monomer and catalyst is formed into a cement which comprises polymer and unreacted monomer, having a viscosity that will allow the cement to be conveyed through the devolatilization zone section of the polymerization vessel, if desired. The cement may be terminated by introducing a termination agent into the reaction zone at a location where polydiene having the desired molecular weight is produced.

In the present process, any conjugated diene monomer or mixtures thereof, can be used in the practice of the present invention. Specific examples of conjugated diene monomers suitable for use herein include 1,3-butadiene, isoprene, 2,3-dimethyl-1,3-butadiene, 2-ethyl-1,3-butadiene, 2-methyl-1,3-pentadiene, 1,3-pentadiene, 3-methyl-1,3-pentadiene, 4-methyl-1,3-pentadiene, 1,3-hexadiene, and 2,4-hexadiene, and the like, and mixtures thereof.

The lanthanide-based catalyst system used in the practice of this invention comprises (a) any lanthanide compound, (b) any aluminoxane, (c) any organoaluminum compound other than an aluminoxane, and (d) any halogen-containing compound. In one or more embodiments, other organometallic compounds, Lewis bases, and/or catalyst modifiers may be employed in addition to the ingredients (a)-(d). In one embodiment, a nickel-containing compound may be employed as a molecular weight regulator as disclosed in U.S. Pat. No. 6,699,813, which is incorporated herein by reference.

Any lanthanide compound or mixtures thereof can be employed as the ingredient (a) of the catalyst system. In one embodiment, the lanthanide compounds may be soluble in hydrocarbon solvents such as aromatic hydrocarbons, aliphatic hydrocarbons, or cycloaliphatic hydrocarbons. In another embodiment, the lanthanide compounds may be insoluble in hydrocarbon solvents but can be suspended in the polymerization medium to form the catalytically active species. Further, a Lewis base such as tetrahydrofuran, acetylacetone, pyridine, or an alcohol may be employed as an aid for solubilizing the lanthanide compounds.

The lanthanide compound may include at least one atom of lanthanum, neodymium, cerium, praseodymium, promethium, samarium, europium, gadolinium, terbium, dysprosium, holmium, erbium, thulium, ytterbium, lutetium, and didymium. In one embodiment, these compounds include neodymium, lanthanum, samarium, or didymium. Didymium may include a commercial mixture of rare-earth elements obtained from monazite sand.

The lanthanide atom in the lanthanide compounds can be in various oxidation states including but not limited to the 0, +2, +3, and +4 oxidation states. Suitable lanthanide compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds. Where lanthanide halides, lanthanide oxyhalides, or other lanthanide compounds containing one or more labile halogen atoms are employed, the lanthanide-containing compound can serve as both the ingredient (a) and the ingredient (d) of the catalyst system.

Suitable lanthanide compounds are described in U.S. Pat. No. 7,094,849 which is incorporated herein by reference. In one embodiment, neodymium compounds are used. In another embodiment, neodymium carboxylates are used. In still another embodiment, neodymium carboxylates such as neodymium 2-ethylhexanoate and neodymium neodecanoate (also called neodymium versatate) are used. In a further embodiment, neodymium organophosphates are used.

Any aluminoxane or mixture thereof, can be used as the ingredient (b) of the catalyst system. Aluminoxanes include oligomeric linear aluminoxanes that can be

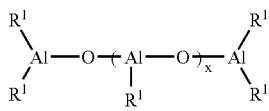

represented by the general formula:
and oligomeric cyclic aluminoxanes that can be represented by the general formula:

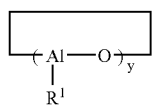

where x is an integer of 1 to about 100, preferably about 10 to about 50; y is an integer of 2 to about 100, preferably about 3 to about 20; and where each $R^1$, which may be the same or different, is a mono-valent organic group that is attached to the aluminum atom via a carbon atom. Preferably, each $R^1$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, tin, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting one or more trihydrocarbylaluminum compounds with water. This reaction can be performed according to known methods, such as (1) a method in which the trihydrocarbylaluminum compounds are dissolved in an organic solvent and then contacted with water, (2) a method in which the trihydrocarbylaluminum compounds are reacted with water of crystallization contained in, for example, metal salts, or water adsorbed in inorganic or organic compounds, and (3) a method in which the trihydrocarbylaluminum compounds are reacted with water in the presence of the monomer or monomer solution that is to be polymerized.

Suitable aluminoxane compounds include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, 2,6-dimethylphenylaluminoxane, and the like, and mixtures thereof. Modified methylaluminoxane can be formed by substituting about 20-80% of the methyl groups of methylaluminoxane with C2 to C12 hydrocarbyl groups, preferably with isobutyl groups, by using techniques known to those skilled in the art.

In one embodiment, the ingredient (b) of the catalyst system is methylaluminoxane (MAO). In another embodiment, the ingredient (b) of the catalyst composition is modified methylaluminoxane (MMAO)

Any organoaluminum compound or mixture thereof can be used as the ingredient (c) of the catalyst system. An "organoaluminum compound" may be defined as any aluminum compound containing at least one aluminum-carbon bond. Where an organoaluminum compound containing one or more labile halogen atoms is employed, the organoaluminum compound can serve as both the ingredient (c) and ingredient (d) of the catalyst system.

Non-limiting examples of suitable organoaluminum compounds can be represented by the general formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3. Preferably, each R is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, tin, sulfur, and phosphorus atoms.

Non-limiting examples of organoaluminum compounds represented by the general formula $AlR_nX_{3-n}$ include trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. In one embodiment, the ingredient (c) of the catalyst system is a trihydrocarbylaluminum compound. In another embodiment, the ingredient (c) of the catalyst system is a dihydrocarbylaluminum hydride compound. In still another embodiment, the ingredient (c) of the catalyst composition is a hydrocarbylaluminum dihydride compound.

Suitable trihydrocarbylaluminum compounds include trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Suitable dihydrocarbylaluminum hydride compounds include diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Suitable hydrocarbylaluminum dihydride compounds include ethylaluminum dihydride, n-propylaluminum dihydride, isopropylaluminum dihydride, n-butylaluminum dihydride, isobutylaluminum dihydride, and n-octylaluminum dihydride.

Suitable dihydrocarbylaluminum chloride compounds include diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Suitable hydrocarbylaluminum dichloride compounds include ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds include dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Any halogen-containing compound, or mixture thereof, that contain one or more labile halogen atoms can be employed as the ingredient (d) of the catalyst system. Examples of halogen atoms include, but are not limited to, fluorine, chlorine, bromine, and iodine. A combination of two or more halogen atoms can also be utilized. In one embodiment, the halogen-containing compounds may be soluble in hydrocarbon solvents. In another embodiment, the halogen-containing compound may be insoluble in hydrocarbon solvents, but they can be suspended in the polymerization medium to form the catalytically active species.

Useful types of halogen-containing compounds include, but are not limited to, elemental halogens, mixed halogens, hydrogen halides, organic halides, inorganic halides, metallic halides, organometallic halides, and mixtures thereof. In one embodiment, the ingredient (d) of the catalyst system is an organic halide. In another embodiment, the ingredient (d) of the catalyst system is a metallic halide. In still another embodiment, the ingredient (d) of the catalyst system is an organometallic halide.

Suitable elemental halogens include fluorine, chlorine, bromine, and iodine. Suitable mixed halogens include iodine monochloride, iodine monobromide, iodine trichloride, and iodine pentafluoride.

Suitable hydrogen halide compounds include hydrogen fluoride, hydrogen chloride, hydrogen bromide, and hydrogen iodide. Suitable organic halides include t-butyl chloride, t-butyl bromides, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

Suitable inorganic halide compounds include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Suitable metallic halide compounds include tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Suitable organometallic halide compounds include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

In the practice of the present invention, the lanthanide-based catalyst can be employed over a wide range of catalyst concentrations and catalyst ingredient ratios. The optimum concentration of any one catalyst ingredient may be dependent upon the concentrations of the other catalyst ingredients.

The molar ratio of the aluminoxane to the lanthanide compound (Al/Ln) can be varied from about 5:1 to about 1000:1, in another embodiment from about 10:1 to about 700:1, and in still another embodiment from about 20:1 to about 500:1, where the molar ratio refers to the moles of aluminum atoms in the aluminoxane to the moles of lanthanide atoms in the lanthanide compound.

The molar ratio of the organoaluminum compound to the lanthanide compound (Al/Ln) can be varied from about 1:1 to about 200:1, in another embodiment from about 2:1 to about 100:1, and in yet another embodiment from about 5:1 to about 50:1.

The molar ratio of the halogen-containing compound to the lanthanide compound is best described as the ratio of the moles of halogen atoms in the halogen-containing compound to the moles of lanthanide atoms in the lanthanide compound (halogen/Ln). The halogen/Ln molar ratio can be varied from about 0.5:1 to about 20:1, in another embodiment from about 1:1 to about 10:1, and in still another embodiment from about 2:1 to about 6:1.

The lanthanide-based catalyst can be formed by combining or mixing the catalyst ingredients(a), (b), (c), and (d). The degree of interaction or reaction between the various ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

The catalyst composition can be formed by using any known method, such as one of the following methods:

In one embodiment, the catalyst composition may be formed in situ by separately adding the four catalyst ingredients to the monomer to be polymerized in either a stepwise or simultaneous manner.

In another embodiment, the catalyst composition may be preformed. That is, the four catalyst ingredients are pre-mixed outside the polymerization system either in the absence of any monomer or, preferably, in the presence of a small amount of at least one conjugated diene monomer at an appropriate temperature, which is generally from about −20° C. to about 80° C. Specific examples of conjugated diene monomers have been set forth above. The conjugated diene monomer used for preforming the catalyst can be the same as or different from the monomer to be polymerized. The amount of conjugated diene monomer used for preforming the catalyst can range from about 1 to about 500 moles, more preferably from about 5 to about 250 moles, and even more preferably from about 10 to about 100 moles per mole of the lanthanide compound. The resulting preformed catalyst composition can be aged, if desired, prior to being added to the monomer that is to be polymerized.

In yet another embodiment, the catalyst composition may be formed by using a two-stage procedure. The first stage involves reacting the lanthanide compound with the aluminoxane and the organoaluminum compound either in the absence of any conjugated diene monomer or, preferably, in the presence of a small amount of at least one conjugated diene monomer at an appropriate temperature, which is generally from about −20° C. to about 80° C. The amount of conjugated diene monomer used in this first stage is generally the same as that amount used for preforming the catalyst as described in the previous paragraph. In the second stage, the mixture prepared in the first stage and the halogen-containing compound are charged in either a stepwise or simultaneous manner to the monomer that is to be polymerized.

The lanthanide-based catalyst exhibits high activity for polymerizing conjugated dienes. Although one preferred embodiment of this invention is directed toward the polymerization of 1,3-butadiene into cis-1,4-polybutadiene, the process of this invention can also be utilized for the polymerization of other conjugated dienes into cis-1,4-polydienes. Further, the process of this invention can also be utilized for the copolymerization of two or more conjugated dienes into copolymers having a cis-1,4 microstructure. Specific examples of conjugated dienes have been set forth above.

The polymerization of conjugated dienes according to this invention is conducted in the presence of a catalytically effective amount of the lanthanide catalyst. The total catalyst concentration to be employed in the polymerization mass depends on the interplay of various factors such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients should be used. Generally, the amount of the lanthanide compound used can be varied from about 0.001 to about 1 mmol, in one embodiment from about 0.005 to about 0.5 mmol, and in another embodiment, from about 0.01 to about 0.2 mmol per 100 g of conjugated diene monomer.

In the present process, monomer is mixed with polymerization catalyst in a mixing vessel. In another embodiment, the monomer is mixed with catalyst as quickly as possible to reduce as much as possible the occurrence of any polymerization reaction in the mixing vessel. This occurs since bringing the catalyst components together, in the presence of the monomer, causes the polymerization reaction to proceed. In general, it is desirable that no substantial monomer conversion occur in the mixing vessel.

Subsequent to bringing together the monomer and catalyst, the resulting stream comprising the monomer and catalyst is, in one embodiment, immediately, injected through an orifice into the reaction zone of the polymerization vessel. The orifice through which the stream passes may be a flow restricting device that serves to create back-pressure, and prevents monomer from vaporizing undesirably, in one embodiment, in the mixing vessel.

The polymerization vessel comprises both a reaction zone and a devolatization zone. Both the reaction zone and the devolatization zone have a common vapor space, which means that the pressure in these two zones is the same. The pressure of the polymerization vessel is controlled to control the rate of devolatization from the polymer mass. In one embodiment, the pressure in the polymerization vessel, that comprises both the reaction zone and the devolatization zone is maintained at a level that is lower than the pressure in the mixing vessel, and such that the pressure drop across the orifice is low enough to avoid the atomization of the stream of monomer and catalyst into a spray. Atomization is defined as a process whereby a volume of liquid is disintegrated into a multiplicity of small drops. For further information on this matter, reference is made to "Atomization and Sprays," Tamburrino S., and Prescott M., Ed., Hemisphere Publishing Corp., 1989.

Once the catalyst and monomer are brought into contact, the polymerization reaction proceeds and polymer formation is initiated. The polymer and catalyst containing stream is immediately, in one embodiment, injected through an orifice downwardly into a polymerization vessel wherein pressure is controlled and maintained at a level that causes vaporization of unreacted monomer from the polymer mass.

In one embodiment, the result of passing the cement stream through an orifice of the mixing vessel and into the reaction zone of the polymerization vessel, maintained at appropriate pressure conditions, is that the flowing cement stream will not cause fouling of the processing equipment. This is achieved since the cement stream is maintained in the form of a continuous flowing stream and does not interact with any stationary surface until, and if, the devolatilization zone of the polymerization vessel is reached. Generation of a continuous flow stream of cement minimizes the amount of discrete droplets produced. The discrete droplets could cling to the walls of the reaction section and cause fouling which could result in having to shut down the process. At this point in the process, a polydiene product has been produced. In the reaction zone, some devolatilization of the monomer may occur.

Furthermore, the reaction zone of the polymerization vessel should be of sufficient length that the cement stream, passing from the reaction zone to the devolatilization zone, has a viscosity that renders the cement stream suitable for conveying through, in one embodiment, a devolatilization zone that includes a horizontal devolatilizer.

The devolatilization zone, in one embodiment, includes a horizontally agitated pipe, and is intended to drive off unreacted monomer. This is achieved by various manners, such as creating new surface from which monomer may diffuse, and by heating the polymer through input of mechanical energy by way of a rotor and/or through a jacket.

Additives of various types may be introduced in the reaction zone, such as polymerization suppressors, functionalizing agents, coupling agents, terminators, antioxidants, and the like. In particular, termination of the polymer cement is, in one embodiment, achieved by adding a termination agent to the end of the reaction zone at a location where the desired molecular weight polymer is produced. The resultant polymer is discharged by any suitable means, such as by an extruder.

Catalyst concentration and reaction/residence time will determine the conversion of the monomer. It is desirable that monomer conversion reach levels of at least 10%, and desirably much higher provided that the desired polymer properties are not adversely affected.

With respect to the polymerization process described herein, the following are expectations.

(a) the polymers produced by the process, in one embodiment, will have high cis-1,4-linkage content, such as about 99%; and high content of reactive polymer chain ends, such as about 95%;

(b) should overheating or temperature control problems occur as a result of undesired reaction in the mixing vessel, for example, in one embodiment, it is only necessary to stop the flow of catalyst to the mixing vessel; and (c) process controls can be simplified, in one embodiment, since there is low risk of reaction run-away and/or potential over-pressurization of the process vessel.

It should be understood clearly that the forms of the invention herein described are illustrative only and are not intended to limit the scope of the invention. The present invention includes all modifications falling within the scope of the following claims.

We claim:

1. A process for producing a conjugated diene-containing polymer comprising:

a) mixing in a mixing vessel a conjugated diene monomer with a catalyst comprising a lanthanide compound, a halogen-containing compound, an organoaluminum compound, and an aluminoxane to produce a stream comprising the conjugated diene monomer and the catalyst; and b) passing the resulting stream through an orifice into a reaction zone of a polymerization vessel wherein pressure is maintained at a level lower than the pressure of the mixing vessel and wherein the pressure drop across the orifice avoids atomization of the stream comprising the conjugated diene monomer and catalyst; whereby in the reaction zone of the polymerization vessel there is formed a cement.

2. The process of claim 1, wherein the cement has a viscosity that allows the cement to be conveyed through a devolatilization zone of the polymerization vessel.

3. The process of claim 2, wherein the cement is devolatilized.

4. The process of claim 1, wherein a termination agent is introduced into the reaction zone of the polymerization vessel at a location where the diene-containing polymer has a desired molecular weight.

5. The process of claim 1, wherein the lanthanide compound is a neodymium compound.

6. The process of claim 1, wherein the aluminoxane is methyl aluminoxane.

7. The process of claim 1, wherein the stream is passed through the orifice, in a downward direction, into the reaction zone of the polymerization vessel.

8. The process of claim 1, wherein the pressure in the polymerization vessel is maintained at a level that initiates vaporization of unreacted monomer from the polymer mass.

9. The process of claim 1, wherein the stream comprising the diene monomer and the catalyst, is maintained in the form of a continuous flowing stream, in the polymerization vessel.

10. The process of claim 1, wherein the catalyst comprises a molar ratio of aluminoxane to lanthanide compound (Al/$L_n$) ranging from about 5:1 to about 1000:1, wherein the molar ratio is the moles of aluminum atoms in the aluminoxane to the moles of lanthanide atoms in the lanthanide compound.

11. The process of claim 1, wherein the catalyst comprises a molar ratio of organoaluminum compound to lanthanide compound (Al/$L_n$) ranging from about 1:1 to about 200:1.

12. The process of claim 1, wherein the catalyst comprises a molar ratio of halogen-containing compound to lanthanide compound (halogen/$L_n$) ranging from about 0.5:1 to about 20:1, wherein the molar ratio is the moles of halogen atoms in the halogen-containing compound to the moles of lanthanide atoms in the lanthanide compound.

13. The process of claim 1, wherein the catalyst is present in a catalytically effective amount.

14. The process of claim 1, wherein the catalyst is present in an amount ranging from about 0.001 mmol to about 1 mmol per 100 grams of conjugated diene monomer.

* * * * *